United States Patent [19]
Lerche et al.

[11] Patent Number: 5,511,163
[45] Date of Patent: Apr. 23, 1996

[54] NETWORK ADAPTOR CONNECTED TO A COMPUTER FOR VIRUS SIGNATURE RECOGNITION IN ALL FILES ON A NETWORK

[75] Inventors: Michael Lerche, Charlottenlund; Carsten Howitz, Rungsted Kyst, both of Denmark

[73] Assignee: Multi-Inform A/S, Denmark

[21] Appl. No.: 325,466

[22] Filed: Dec. 19, 1994

[30] Foreign Application Priority Data

Apr. 28, 1992 [DK] Denmark .................................. 550/92
Oct. 15, 1992 [DK] Denmark ................................ 1264/92

[51] Int. Cl.[6] ..................................................... G06F 11/00
[52] U.S. Cl. ................... 398/183.04; 395/183.15
[58] Field of Search .......................... 395/575; 364/274.2, 364/276.6, 286.4, 944.9

[56] References Cited

U.S. PATENT DOCUMENTS

| | | | |
|---|---|---|---|
| 4,874,963 | 10/1989 | Alspector | 307/201 |
| 4,975,950 | 12/1990 | Lentz | 380/4 |
| 5,065,339 | 11/1991 | Vassiliadis et al. | 395/24 |

FOREIGN PATENT DOCUMENTS

| | | |
|---|---|---|
| 0288636 | 9/1987 | European Pat. Off. . |
| WO91113403 | 2/1991 | WIPO . |

OTHER PUBLICATIONS

Artificial Immunity for Personal Computers, *IBM Technical Disclosure Bulletin*, vol. 34, No. 2, Jul. 1991.
David, J., Lan Viruses, *Computer Security Journal*, vol. 7 No. 1 (1991), pp. 53–59.
Guinier, D., Computer "virus" identification by neeural networks, *SIGSAC Review*, vol. 9 No. 4 (1991), pp. 49–59.
An Introduction to Operating Systems, Scond Edition, by Harvey M. Deitel ©1990 by Addison–Wesley Publishing Co. pp. 549–552.

*Primary Examiner*—Vincent P. Canney
*Attorney, Agent, or Firm*—Flehr, Hohbach, Test, Albritton & Herbert

[57] ABSTRACT

A data processing system comprising a plurality of computers interconnected through a local network, preferably in the form of a ring. The network being connected to a network adapter which is able to receive all information on the network. The network adaptor is connected to a computer which together with the adaptor can perform an assembling and scanning of substantially all files on the network and carry out a recognition of virus signatures. The individual file packets circulation in the network are assembled, said file packets being assembled in a file and scanned for virus signatures. When a virus signature is detected in the file, information is simultaneously provided on the transmitting stations and the receiving stations, whereafter it is possible to transmit the vaccine to the stations in question.

6 Claims, 5 Drawing Sheets

Perceptron

NETWORK ADAPTOR CONNECTED TO A COMPUTER FOR VIRUS SIGNATURE RECOGNITION IN ALL FILES ON A NETWORK

TECHNICAL FIELD

The invention relates to a data processing system comprising a plurality of computers interconnected through a local network, preferably in form of a ring network, said network being connected to a network adaptor which is able to receive all information on the network.

BACKGROUND ART

Such a network adaptor is able to measure the performance and the speed of the network, inter alia in order to evaluate whether the network is optimally structured.

A ring network can be connected to a network server. The network server can comprise a network program accessible for the users at each work station. Each user can furthermore have access to the logic drive of the network server, whereby the user can enter programs and data which can subsequently be read by another user without floppy disks being exchanged between the users. The network server can furthermore include a virus program accessible for the user of a work station so as to enable him to scan the local disk for virae. The user can carry out a virus scanning at regular intervals. A virus, if any, may, however, have infected a large number of work stations before being detected.

DESCRIPTION OF THE INVENTION

The object of the invention is to provide a data processing system of the above type, whereby a virus, if any, and computers infected thereby are detected far quicker than previously so as to limit the spreading of the virus.

The data processing system according to the invention is characterised in that the network adaptor is connected to a computer, which together with the adaptor can catch and scan all files on the network and carry out a recognition of virus signatures (bit patterns), if any, in the files. As a result, the file packets circulating in the ring network are assembled in one file. After the assembling in one file, the packets are scanned for detection of virae, if any. If a virus signature is detected in the file, information on the transmitting and receiving stations is provided and an alarm is activated, whereby a further spreading of the virus can be prevented.

Moreover according to the invention, the computer connected to the adaptor may be adapted to transmit a so-called "vaccine" to the computers optionally infected by said virus or said virae. The close-down period of the system due to detection of a virus has thereby been reduced to zero.

Furthermore according to the invention, the vaccine may be implemented by causing the computer connected to the adaptor to start a scanning on the infected computers by means of a program known per se, said program neutralizing the virus.

In addition according to the invention, the computer connected to the adaptor may comprise a neural network in form of a program adapted to recognize the usual interchange of data on the local network and to actuate an alarm if an unusual interchange of data, such as an unknown virus signature, is recognized. In this manner it is also possible to detect hitherto unknown virae and thereby to obtain a better virus detection than previously known.

Furthermore the neural network may according to the invention comprise neuron-like elements.

Finally the neural network may according to the invention be composed of a Boltzmann machine.

BRIEF DESCRIPTION OF THE DRAWINGS

The invention is explained in greater detail below with reference to the accompanying drawings, in which.

BEST MODE FOR CARRYING OUT THE INVENTION

Figure 1:
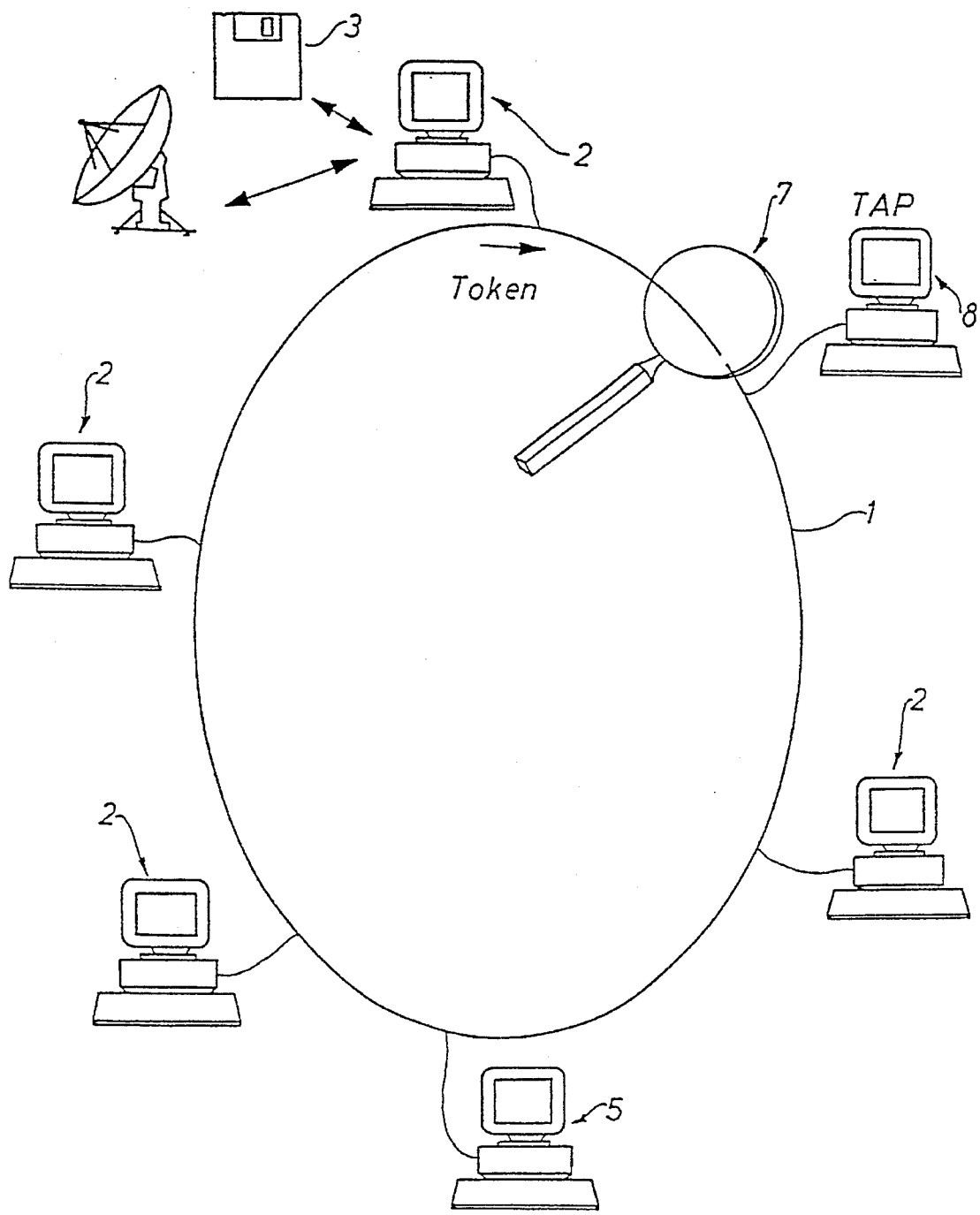
FIG. 1 illustrates a data processing system according to the invention comprising a local network in form of a ring network connected to a number of computers, one of the computers being equipped with a particular network adaptor.
Figure 2:
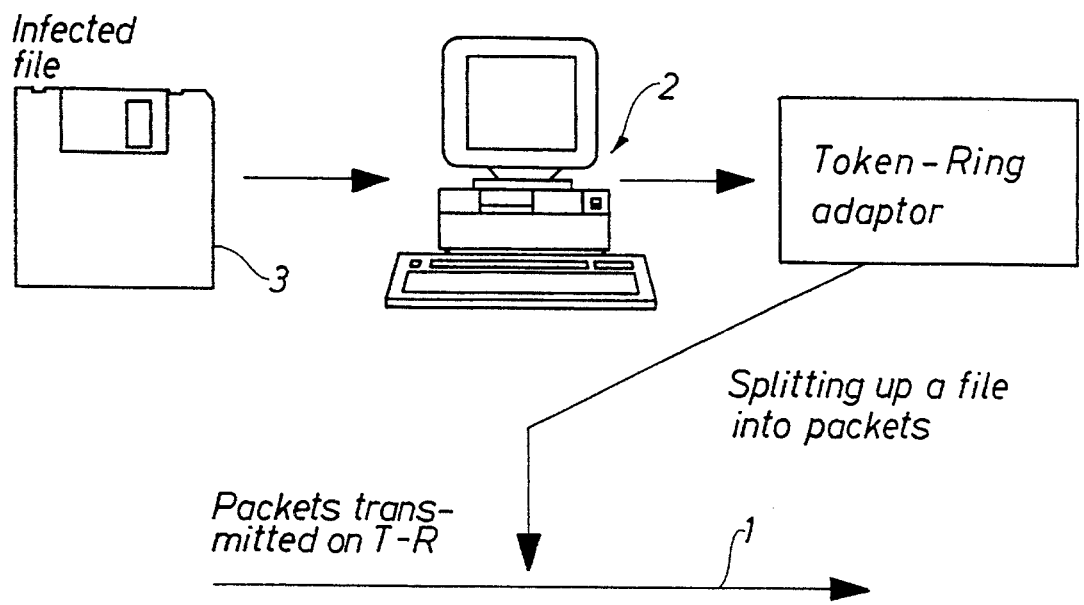
FIG. 2 illustrates how a computer is infected and subsequently infects the network.

The data processing system according to the invention comprises a plurality of computers 2 in form of personal computers interconnected through a local network in form of a ring network 1. A virus can infect a personal computer 2 via a floppy disk 3 inserted in the computer 2 copying the program on the floppy disk 3. As a result the computer is infected by the virus in said program. The infected program can then be transferred via the network to one or several of the remaining personal computers 2 connected to the network 1. The virus is transferred when the program or the program file is divided into packets being transmitted in series via the ring network 1. Each packet includes an address indicating the work station (the personal computer) receiving the packet. The packet circulates in the network 1, and at the receiving work station the address is recognized whereafter the packet can be read by said station. This station is usually the only work station capable of reading the packet and subsequently marking said packet as read. Then the packet is retransmitted via the network 1 to the original work station which checks whether said packet has been read or not. In the affirmative, the packet can be emptied and marked empty.

The network 1 is furthermore connected to a network server 5. Previously, the network server 5 included a program allowing the user to perform a virus scanning at regular intervals of the programs in the personal computer 2. Such a virus control is, however, encumbered with the drawback that a virus, if any, may be spread to a large number of work stations of the data processing system before an alarm is activated.

Figure 3:
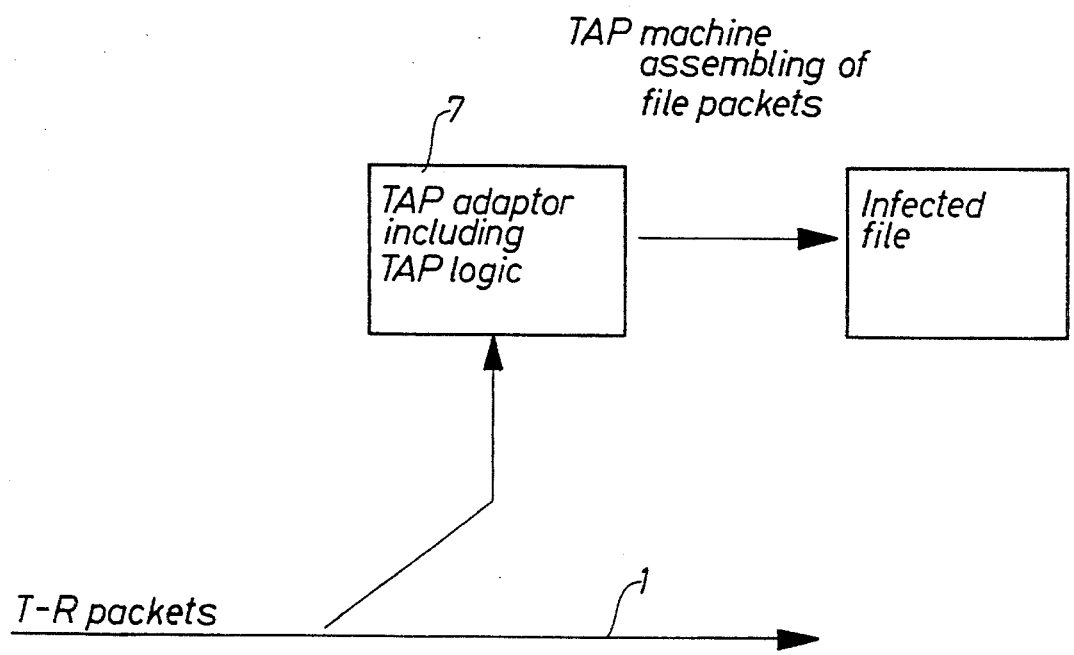
FIG. 3 illustrates how an adaptor connected to the network can assemble packets of information circulating in the network in order to detect virae, if any.

According to the invention, one of the work stations, viz. the work station 8, is connected to a particular network adaptor 7, such as an IBM trace and performance adaptor which is able to receive all information on the network 1. The network adaptor 7 receives selected packets on the network, viz. only packets containing data of interest. The packets continue without delay to the receiving station. Then a TAP logic in the network adaptor 7 assembles the packets in files, cf. FIG. 3, for a scanning and detection of virus signatures, if any. The adaptor 7 has been symbolized in FIG. 1 by means of a magnifying glass and is connected to the computer 8. The computer 8 is able to scan the files and recognize virus signatures, if any.

A program comprises a number of commands to an electronic data processing system. The commands are encoded in hexadecimal codes easy to recognize. In this manner it is possible to compare the program with program signatures in order to ensure that said program signature is in fact a portion of the complete program. A virus is in fact a program and can therefore be recognized in the same manner. As far as a known virus is concerned all the files of an electronic data processing system can be scanned for the signature of said virus by the system performing a comparison with said signature. If the signature is a portion of a file, said file may have been infected. A large number of programs are able to scan for known virus signatures. These programs render it possible to determine whether an electronic data processing system is infected by known virae.

When a virus is detected, an alarm is instantaneously activated and a so-called "vaccine" is transmitted to the personal computers having received infected information, which is possible because each packet in the ring network 1 contains the addresses of the transmitting and the receiving stations of the information in question. The vaccine is provided for instance by means of the program "Clean" sold by the company Mcafee. This program can erase or write over a virus program typically placed in front of or after the actual program. If the virus program is placed in front of the actual program, an indication can be provided after the erasing of or writing over said virus that the actual program does not start until later. A quick transmission of such a vaccine minimizes the spreading of the virus. The principle is particularly suited in connection with a ring network as the information packets pass the adaptor 7 during each running and are thereby detected as quickly as possible.

Figure 4:
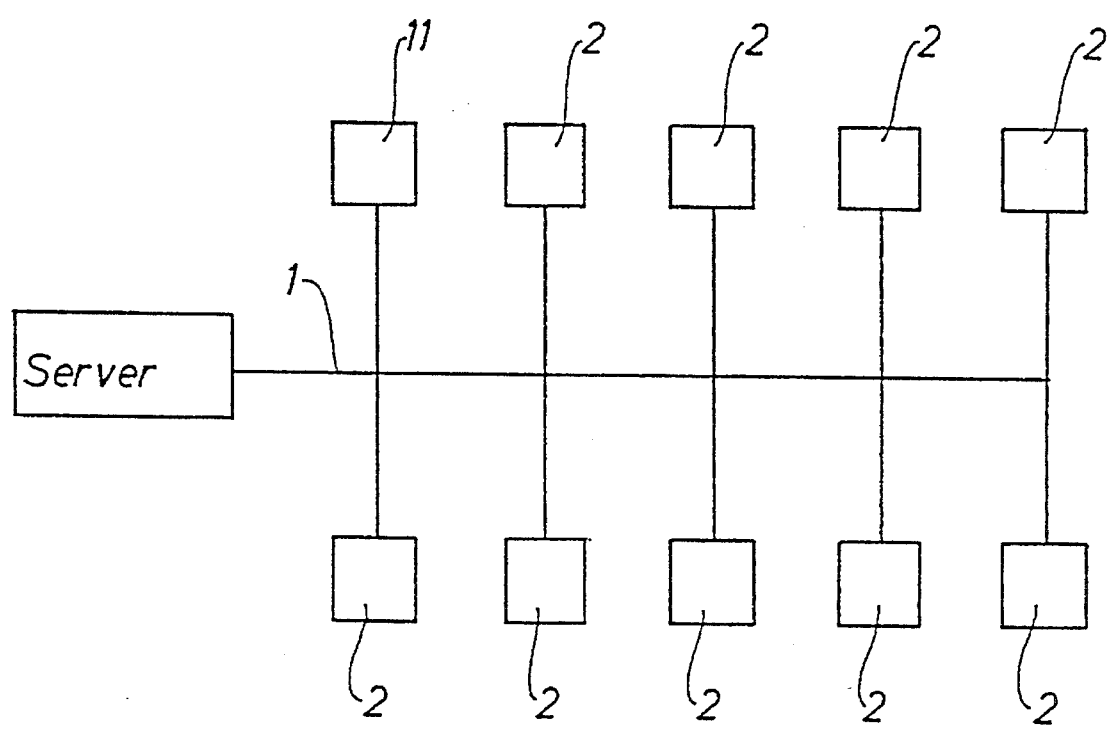
FIG. 4 illustrates a data processing system comprising a local network in form of a string network connected to a plurality of computers, one of said computers being equipped with a particular network adaptor.

The principle can, however, also be used in connection with a string network, cf. FIG. 4. All the work stations 2 coupled in a string network 1 receive the same information. However, only the work station comprising an address corresponding to the receiving address can read the information. A TAP machine 11 is also connected to the string network. The TAP machine is equipped with a particular adaptor and can therefore also read the information. This adaptor can for instance be of the type spider analyzer 325-R version 2.1 sold by the company Spider Systems. The adaptor of the TAP machine 11 considers itself a receiving station for all the information packets although this is not the case. The adaptor has been set in a particular mode implying that it ignores the address and reads all the packets. The adaptor comprises a buffer in which the packets are stored. The buffer is emptied now and then, such as when it is full, or is about to be full. The buffer is emptied by means of network software. A plurality of packets corresponding to several files may optionally be transmitted at the same time. The network software converts the packets into a form readable by the operative system in question. In this manner the operative system can write the files in a disk or store them in the memory of the machine.

The data processing system can be further developed so as also to be able to recognize a new virus and send a vaccine to it. The further development is found in the fact that the work station 8 or 11 connected to the network adaptor in addition comprises a neural network in form of a program designed to distinguish between normal and abnormal interchange of data on the local network and to activate an alarm in case of an abnormal interchange of data in form of an unknown signature possibly corresponding to yet another unknown virus.

The system utilizes the fact that far the most virae have certain common features. A machine reading from examples can therefore be programmed to detect far the most virae. Such a machine can for instance be a Hopfield network known per se or a Boltzmann machine being identical with a Hopfield network apart from one significant difference. When a unit in the network is to decide the succeeding function thereof, an arbitrary signal is programmed into the unit. This arbitrary signal "shakes" the network out of local optima in such a manner that it is possible to determine the globally best configurations. A surprising property of this network is that it is possible to determine a very simple relation between a predetermined weight factor and the global behaviour of the network although said network is very complex. The network can be presented to coherent in- and output signals and can thereby adjust the individual weight factors and consequently adapt the behaviour of the network to the desired behaviour. As a result, a gradual improvement takes place of the behaviour of the network.

Figure 5:
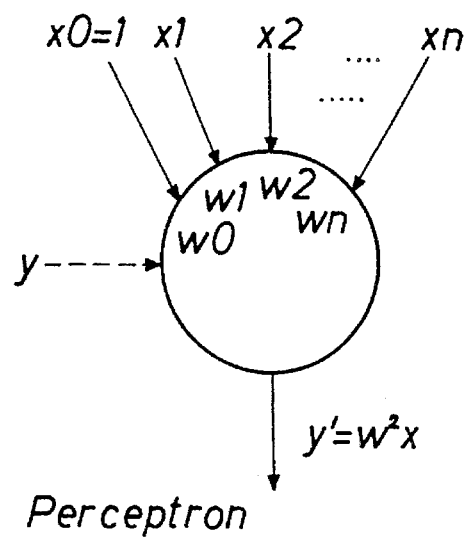
FIG. 5 illustrates a neuron for recognition of hitherto unknown virae.

According to a particular, single case the neural network can be a perceptron. Such a perceptron is shown in FIG. 5 and comprises one or several processing elements (neurons)in a layer. For the sake of simplicity, only one of these processing elements is described below.

The perceptron of FIG. 5 comprises only one neuron and receives a plurality of input signals $X_0, X_1, X_2 \ldots$ and transmits an output signal Y'. While programming the neuron, the correct output signal corresponding to the transmitted input signals is transmitted. The input signals are expressed by a vector $\overline{X}$ of the dimension N+1. $X_0$ has been set to 1. Each signal $X_p$ of the vector $\overline{X}$ is weighed by a weight factor $W_p$ of a vector $\overline{W}$ also of the dimension N+1. The output signal Y' is calculated as the sum of the products $X_0 \cdot W_0 \ldots X_n \cdot W_n$ corresponding to the vector product $\overline{W} \cdot \overline{X}$. If this vector product exceeds O, Y' is set to 1 or 0 corresponding to class 0 or 1. Thus the neuron is able to place a predetermined vector in one out of two classes. Now the neuron is presented to a large number of various $\overline{X}$, each $\overline{X}$ being of the class 0 or 1. During the programming, the neuron is provided with a vector $\overline{X}$ together with the correct class. As a result the neuron can adjust its weight factors according to the formula $$\overline{W}^{new} = \overline{W}^{old} + (Y-Y') \cdot \overline{X},$$

where Y represents the correct class of the input signal vector $\overline{X}$ in question, and Y' represents the output signal ($\overline{W} \cdot \overline{X}$) of the neuron. This formula is called the programming instructions and indicates how the weight factors of the neuron are adjusted.

A perceptron comprising one of more neurons can be used for recognizing a pattern, such as a virus signature. A perceptron for recognizing a virus signature includes preferably at least two neurons. It is assumed that a virus signature has a maximum length of m hexadecimal figures of 8 bits. A hexadecimal figure of 8 bits can assume 256 various values. The input signal vector $\overline{X}$ must then have the dimension m·(256+1). All possible combinations of virus signatures therefore result in various $\overline{X}$-vectors.

The data structure of the perceptron is indicated below in a Pascal-like syntax.

Perceptron

| Type | |
| --- | --- |
| Figure value | = actual figure |
| Class | = [0;1] |
| Input vector | = array [1..m;0..256] of figure value |
| Weight vector | = array [1..m;0..256] of figure value |
| Neuron | = position |
| | W: weight vector |
| | Y': class |
| | Final post |
| Perceptron | = position |
| | Neuron 1: Neuron |
| | Neuron 2: Neuron |
| | Final post |

Initially $\overline{W}$ is set to be = 0.5.

Two procedures must be provided, viz. one for calculating the product $\overline{X} \cdot \overline{W}$, and one for adjusting the weight factors in accordance with the programming instructions.

Then the perceptron is presented to a large number of virus signatures as well as to a large number of signatures without virus.

When the signature is a virus, the class for the neuron 1 must be 1, whereas the class for neuron 2 must be 0. When the signature is not a virus, the class for neuron 1 must be 0 whereas the class for neuron 2 must be 1, i.e.:

The signature is a virus :Neuron 1.Y= 1 and Neuron 2.Y= 0.

The signature is not a virus :Neuron 1.Y= 0 and Neuron 2.Y= 1

After the supply of a virus signature, the weight factors of the neurons must be adjusted by means of the programming instructions until the perceptron has been stabilized such that the number of correct answers is no longer changed. When this is the case, no further adjustments are performed by means of the programming instructions.

A perceptron implemented in this manner cannot only recognize known virae, but also unknown virae provided the signature thereof "resembles" the signature of the virae already presented to the perceptron.

A new virus often resembles a known virus as many new virae are developed on the basis of known virae. A few virae are furthermore able to change the signature all the time by adding NOP's (no operation) to the signature. In other words the virus mutates. An NOP does not involve activity, and the functions of the virus remain unchanged. The signature of the virus is, however, changed. In many cases the perceptron is also able to recognize such routants as the insertion of NOP's has no decisive effect on the perceptron.

Further details concerning the implementing of programming instructions in form of programming algorithms appear from the literature "Neurocomputing" by Robert Hecht-Nielsen published by Addison-Wesley Publishing Company. ISBN 0-201-09355-3. Reference is in particular made to paragraphs 3.3 and 3.4 forming part of the present specification.

A particular advantage by the data processing system according to the invention is that each user does not have to scan the programs in each personal computer. According to the invention, the network communication is instead scanned centrally.

The computers not or only seldomly transmitting on the network 1, 1' can, however, be infected and must therefore be checked in a conventional manner by each user.

Previously the problem applied to the lack of possibility of localizing the transmitting station having infected the network. The system according to the invention renders it possible to locate the station before the "traces" have been erased.

Figure 6:
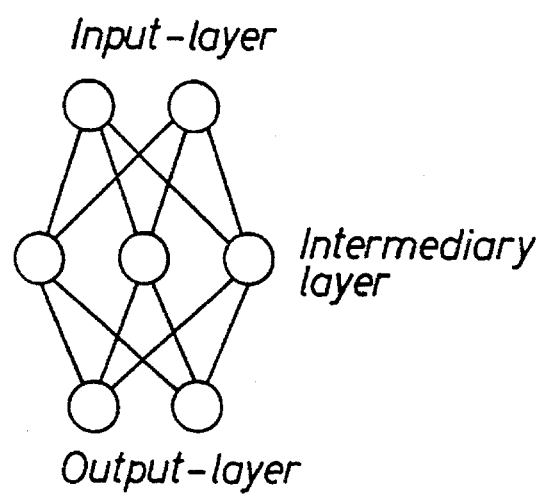
FIG. 6 illustrates a neural network comprising an input layer, an intermediate layer, and an output layer, and FIG. 7 illustrate examples of hypercube multiprocessor structures, in which the data processing system according to the invention can be implemented.
Figure 7:
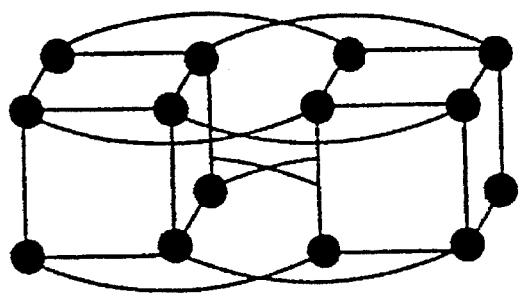
Figure 7:
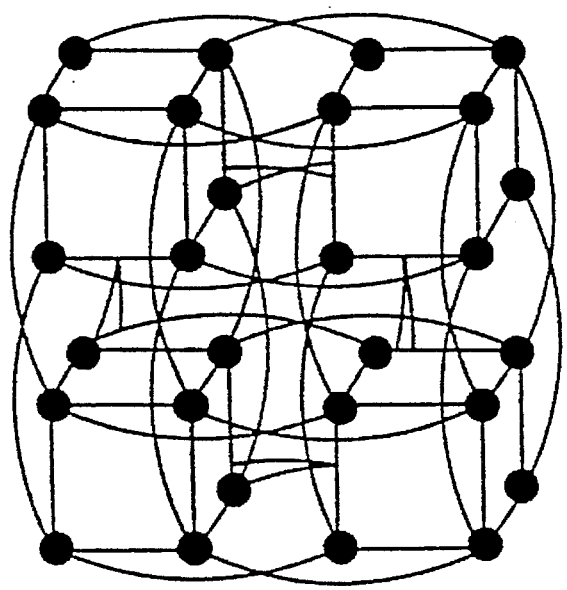

The data processing system according to the invention is not limited to be used in connection with ring or string networks. Usually, it can be used in connection with hypercube multiprocessor structures for instance being characterised by having $2^n$ processors interconnected via an n-dimensional cubus, cf. FIG. 6 showing examples of hypercube structures. Reference is in this connection made to the literature "multiprocessors" by Daniel Tabak, Prentice Hall Series in Computer Engineering, especially chapter 2 forming part of the present specification. Each processor comprises direct and separate communication paths to N and other processors. These paths correspond to the edges of the cubus. Hypercube structures are implemented by Intel and Floting Point System indicating transfer speeds of 1 M bit/sec.

The data processing system according to the invention can also be used in connection with Switch network structures and vector processors. In case of switch network structures, it can be necessary to use several network adaptors, each network adaptor being connected to a computer which together with the adaptor carry out an assembling and scanning of files on the network.

We claim:

1. A data processing system comprising a plurality of computers interconnected through a local network in the form of a ring network, said network being connected to a network adaptor which is able to receive all information on the network, characterized in that the network adaptor (7) is connected to a computer (8), which together with the adaptor (7) can perform an assembling and scanning of substantially all files on the network (1) and carry out a recognition of virus signatures, if any, in the files, the computer (8) being adapted to provide information on the place of origin of infected data, if any, as well as on the position to which said infected data has been transmitted, and comprising a neural network having program means for recognizing the usual interchange of data on the local network (1) and for activating an alarm if an unusual interchange of data resembling a virus, such as an unknown virus signature, is recognized.

2. A data processing system as claimed in claim 1, which includes computer means (2) connected to the adaptor (7) for transmitting a virus to the computers (8) optionally infected by said virus.

3. A data processing system as claimed in claim 2, characterized in that the vaccine is implemented by causing the computer (2) connected to the adaptor (7) to start scanning on the infected computers (8).

4. A data processing system as claimed in claim 1, characterized in that the neural network comprises neuron-like elements.

5. A data processing system as claimed in claim 1, characterized in that the neural network is comprised of a Hopfield network.

6. A data processing system as claimed in claim 1, characterized in that the neural network is comprised of a Boltzmann machine.

* * * * *